UNITED STATES PATENT OFFICE.

ARTHUR DEHON LITTLE, OF BOSTON, MASSACHUSETTS, ASSIGNOR, BY MESNE ASSIGNMENTS, TO WILLIAM M. NORRIS, OF PRINCETON, NEW JERSEY, AND HENRY BURK, OF PHILADELPHIA, PENNSYLVANIA.

PROCESS OF TAWING HIDES.

SPECIFICATION forming part of Letters Patent No. 498,067, dated May 23, 1893.

Application filed June 23, 1891. Serial No. 397,234. (No specimens.)

*To all whom it may concern:*

Be it known that I, ARTHUR DEHON LITTLE, a resident of Boston, in the county of Suffolk and Commonwealth of Massachusetts, have invented an Improved Process of Tawing Hides, of which the following is a specification.

This invention relates to a new process of tawing hides, and consists mainly in the employment of a soluble sulphide, as a sulphide of soda, calcium or potassium, in connection with a metallic salt and an acid, for the purpose of tawing hides.

It has heretofore been proposed to use sulphites, or bisulphites, or hyposulphites of soda, in the treatment of hides; but I find that the employment of a soluble sulphide permits of great economy and of sundry advantages in the treament of hides, that I will hereinafter more fully point out.

One of the main advantages of the employment of a sulphide of soda or calcium is that they are used as ingredients in depilating the hides, which is common, and can be continued as an ingredient in the tawing process. In other words, one manner of carrying my invention into effect would be to take a hide or skin, depilate it with the assistance of a sulphide of soda, or calcium, and thereupon, instead of branning or washing it to get the sulphide that was used in the depilating process out of the skin, said sulphide is permitted to remain in the skin, which is then dipped into a mixture of a metallic salt (such as bi-chromate of potash) and an acid (such as hydrochloric acid.) To complete the tawing process, the sulphide of soda or calcium &c. will react with the bichromate of potash and with the acid and with the gelatine in the skin, so as to render the gelatine insoluble, the gas resulting from the reaction being sulphureted hydrogen. By the action of the bichromate of potash in the bath, a chromium compound is formed in the hides or skins, as is well known, while the sulphureted hydrogen is being evolved; these two actions taking place in the presence of each other. But my process is also applicable to skins that have already been depilated and washed, pured or branned, in which case I would proceed as follows: Take the skin and treat it first with a solution of bichromate of potash, until the solution shall have penetrated well through the pores of the skin. A two and one-half per cent. ($2\frac{1}{2}\%$) solution is preferred, but the solution may be made stronger or weaker, according to the circumstances of the case and the thickness of the skin. After the bichromate of potash solution has well penetrated into the skin, it is then placed in a solution of sodium sulphide ($Na_2S$), beginning with about a two per cent. (2%) solution of the sulphide and adding gradually hydrochloric acid and more sulphide, in such proportions as to keep the bath neutral or slightly acid and to evolve sulphureted hydrogen ($H_2S$). The reduction of the bichromate I found to proceed very evenly and with considerable rapidity. The leather formed will be found to have a good surface, to be soft and flexible.

Instead of bichromate of potassium, any other analogous metallic salt may be employed.

I do not limit myself to the proportions of the ingredients used, nor to the order in which they are used, so long as they shall be permitted to act upon one another in the manner specified.

I do not claim broadly tawing skins by first subjecting them to the action of a bath prepared from a metallic salt (such as bi-chromate of potash) and then to the reducing action of hydrogen sulphide, as that forms the subject of an application filed by William M. Norris June 14, 1891, Serial No. 399,448.

What I claim, and desire to secure by Letters Patent, is—

1. The within described process for treating hides and skins, said process consisting in subjecting the hides or skins to the combined action of a soluble sulphide, a metallic salt (such as bichromate of potash), and an acid (such as hydrochloric acid), in the presence of each other substantially as described.

2. As an improvement in tawing hides or skins, the process consisting in forming in the skins a chromium compound and subjecting the same to the action of a solution evolving sulphureted hydrogen.

3. As an improvement in the art of tawing skins or hides, the process consisting in forming in the hides or skins a chromium compound and then subjecting the same to the action of a bath, consisting of sodium sulphide, and an acid, such as hydrochloric acid, substantially as described.

ARTHUR DEHON LITTLE.

Witnesses:
JULIEN STEVENS ULMAN,
ARTHUR V. BRIESEN.